Figure 1:
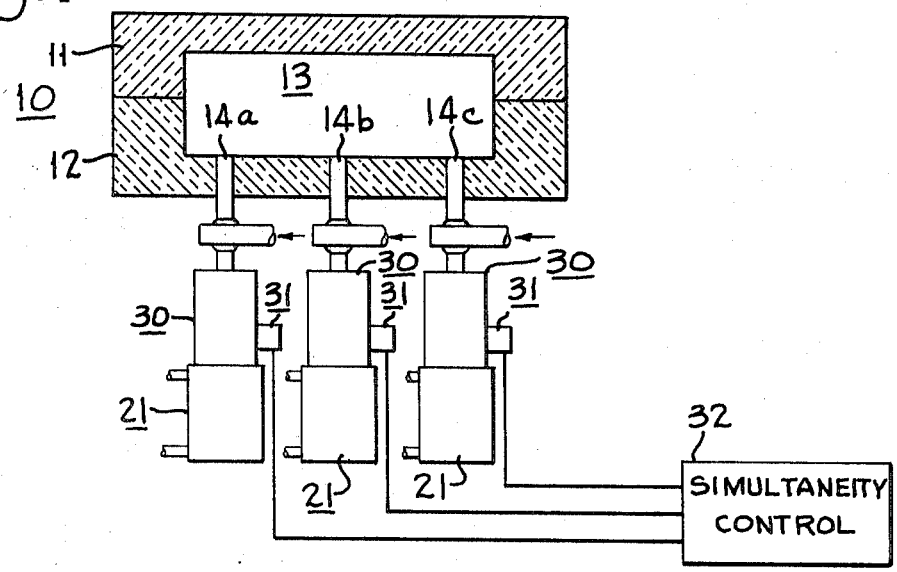

United States Patent

[11] 3,571,856

[72] Inventor Walter D. Voelker
 Philadelphia, Pa.
[21] Appl. No. 824,617
[22] Filed May 14, 1969
[45] Patented Mar. 23, 1971
[73] Assignee Bischoff Chemical Corporation
 Hicksville, N.Y.

[54] APPARATUS FOR SIMULTANEOUSLY OPENING VALVES FOR PLURALITY OF INJECTION NOZZLES
 3 Claims, 4 Drawing Figs.

[52] U.S. Cl. .................................................... 18/30
[51] Int. Cl. .................................................... B23f 1/04
[50] Field of Search .......................................... 18/30
 (NVC), 30 (WJ), 30 (PP), 30 (QP), 30 (CK), 30 (I), (AM), (AS)

[56] References Cited
UNITED STATES PATENTS

| | | | |
|---|---|---|---|
| 2,293,304 | 8/1942 | Muller et al. ................ | 18/30 |
| 2,332,678 | 10/1943 | Tucker ...................... | 18/30 |
| 3,436,793 | 4/1969 | Trueblood ................... | 18/30 |

Primary Examiner—Leonidas Vlachos
Attorney—John R. Webank

ABSTRACT: Giant articles of cellular plastic are molded in injection molding apparatus. Each of a plurality of injection nozzles comprises a bore in which an injection plunger reciprocates between a withdrawn position at which the tip of the injection plunger rests during the brief mold-filling step and an advanced position at which the tip rests during much of the prolonged step of cooling the molded article. As the plunger advances from its withdrawn position, it first acts as a valve to discontinue flow of the plastic into the nozzle bore and then during a principal portion of its advancing stroke, the injection plunger purges the residual cellular plastic between an inlet orifice and the nozzle tip and forces it into the mold. Only in the final stages of the withdrawing stroke does the tip of the injection plunger expose the inlet orifice to open the valve to renew the flow of cellular plastic to the mold. Power means such as a hydraulic cylinder for each injection plunger actuates the reciprocation. The improvement concerns means provided to each injection plunger as soon as it had completed a selected major amount of its withdrawing stroke so that it is temporarily braked at a position near the brink of valve-opening position. Sensors detect and provide signals while an injection plunger is thus braked at a brink of opening position. A simultaneity control system detects the signals and responds as soon as the signals establish that every injection plunger is at such brink of opening position, and then simultaneously releases the brake for each and all of the injection plungers, which then move to the fully withdrawn positions, thereby simultaneously opening all of the valves. More reproducible articles are molded when the plurality of nozzles are reliably opened with improved simultaneity than when the injection plungers withdrawn by the plurality of hydraulic cylinders by a single stage movement.

INVENTOR.
WALTER D. VOELKER
BY
John R. Ewbank
ATTORNEY

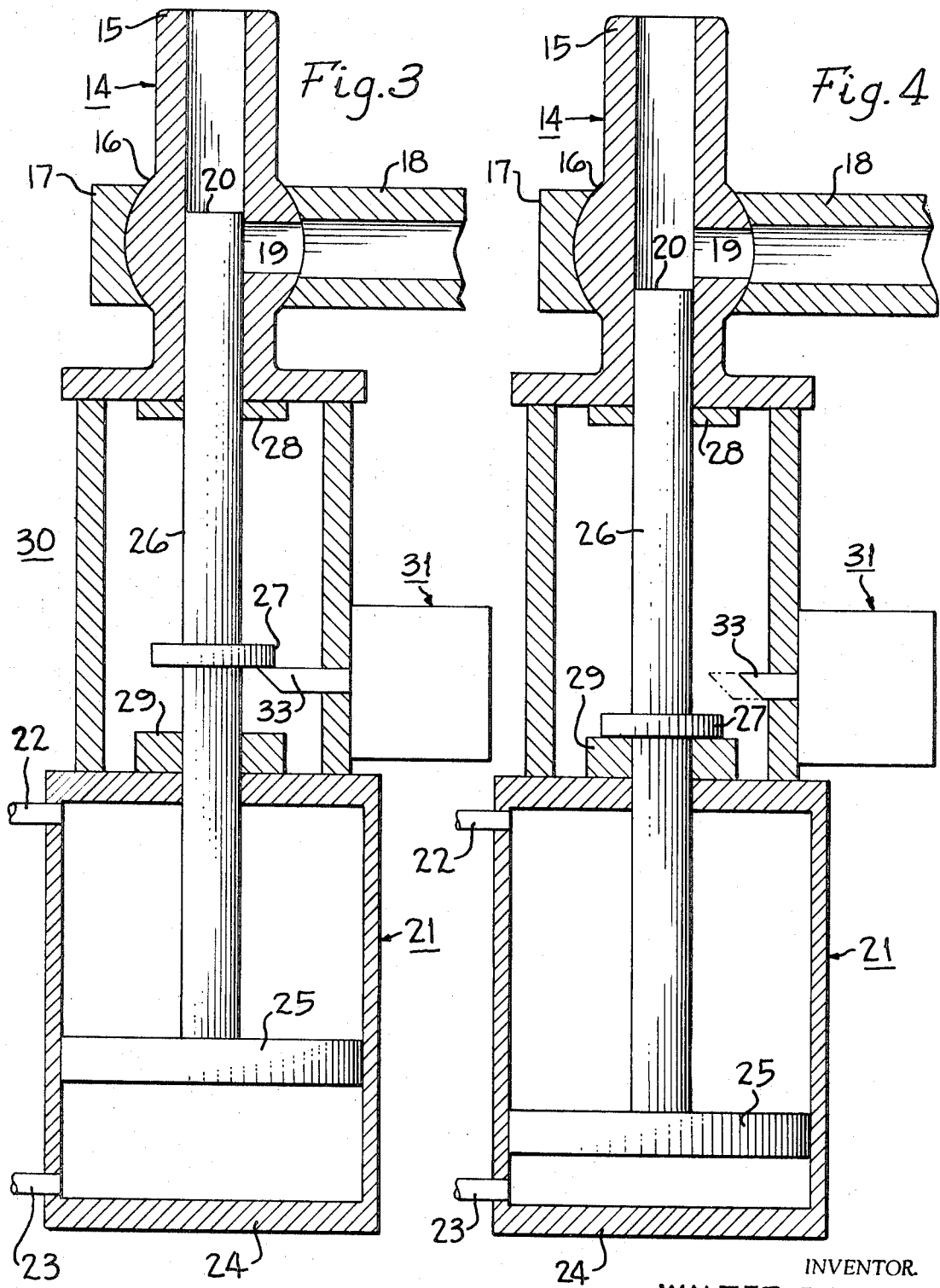

APPARATUS FOR SIMULTANEOUSLY OPENING VALVES FOR PLURALITY OF INJECTION NOZZLES

BACKGROUND

Cellular plastics have been injection molded for several years, generally using apparatus only slightly modified from equipment initially designed for injection molding of plastics free from gas cells. In making giant articles, techniques other than injection molding have generally been employed. Injection molding has generally utilized only a very small number of injection nozzles per mold. When a plurality of injection nozzles have been used, it has generally been feasible to employ a single injection ram mechanically to assure simultaneity of the actuation of the plurality of injection plungers. In molding giant articles, however, in which the farthest apart of the plurality of injection nozzles are so far apart that thermal expansion problems do not favor parallel alignment of the nozzles, it is advantageous to provide angularly displaceable nozzles and an independent means for actuation of each of the injection plungers. It has previously been proposed that each injection plunger be provided with its own hydraulic cylinder with a manifold system providing the plurality of cylinders with the hydraulic fluid for actuation of the injection plungers. As the plunger moves to its advanced position, it purges the nozzle. The amount of time required for each plunger to shift from its advanced position to a fully withdrawn position permitting unrestricted flow of the plastic through the nozzle into the mold is significant. The duration of the flow of the plastic is quite brief. The duration of the flow of the plastic from the various nozzles is not identical if there are significant differences in the timing of the arrival of the tip of the injection plunger at the position opening the entry port to permit flow of the plastic. Although the mold and the process are designed for the simultaneous opening and closing of the plurality of injection plungers, the manifolded plurality of normally reciprocating hydraulic cylinders permits slight differences in the timing of the opening of the nozzles, thus causing unreliable variations in the quantities of plastic sent to various portions of the mold.

SUMMARY

In accordance with the present invention, the mechanism for the actuation of the injection plungers is transformed from a single step movement to a multiple step movement, and the step involving at least the final opening of the flow of the plastic is postponed until there is the assurance that all of the injection plungers will begin such final step of opening the entry ports simultaneously. Each injection plunger is provided with means sensing the position of the injection plunger to detect the arrival of the tip of the injection plunger at the critical prevalving portion of the travel, and all of the injection plungers are locked at said position until all injection plungers have arrived at such position, and then but only then the injection plungers are allowed to advance for the balance of their stroke. Inasmuch as the valving portion of a stroke of the injection plunger constitutes only a small portion of the total travel of the injection plunger, and inasmuch as the closing of such valve is at the beginning of the purging stroke, it is generally feasible to achieve simultaneous closing of the flow from the accumulator into the nozzles without stepwise control of the advancing or purging stroke.

IDENTIFICATION OF DRAWINGS

Figure 2:
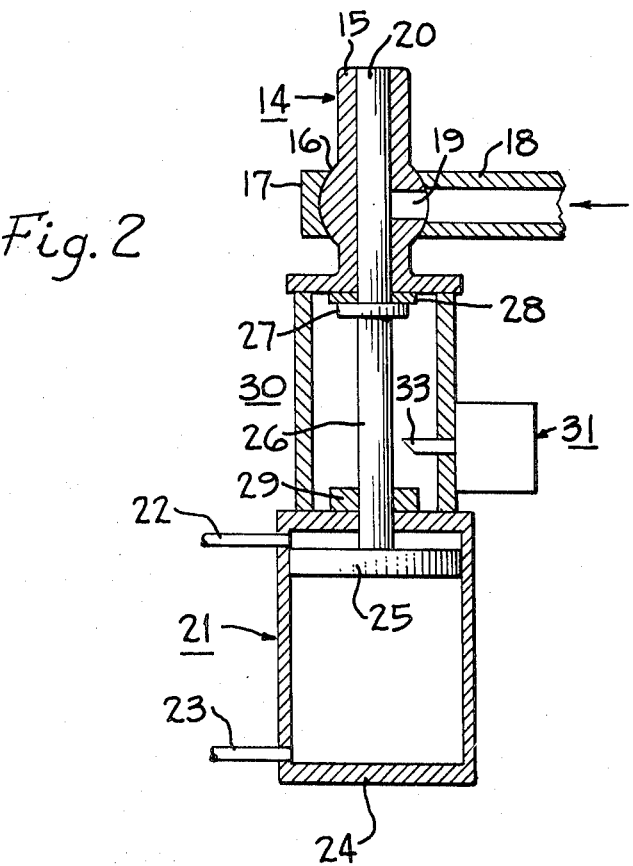

FIG. 1 is a schematic showing of an injection molding apparatus featuring a simultaneity control for regulating a plurality of injection nozzles. FIGS. 2, 3, and 4 show three different positions of the reciprocating injection plunger, that is, an advanced position, a "brink of valve opening" position and a mold-filling position, said plunger being in one of the plurality of injection nozzles of FIG. 1.

DESCRIPTION OF AN EMBODIMENT

As shown in the drawings, a split mold 10 includes a movable portion 11 which can be shifted away to permit removal of the molded article from the mold. The mold also includes a fixed portion 12, which combines with the movable portion to define a cavity 13 in which the article is molded. A plurality of injection nozzles 14 are secured for engagement with the fixed portion 12. A bore of the nozzle is exposed at a nozzle tip 15. The mounting for each nozzle includes a ball 16 and a socket 17, whereby the hot molten plastic fed through a manifold 18 can pass through an orifice 19 in the socket into the bore of the nozzle 14. An injection plunger 26 reciprocates in the bore. A tip 20 of the injection plunger can be shifted sufficiently during the withdrawing stroke to open the orifice 19 during the brief period of filling the cavity 13, and thereafter the injection plunger 26 shifts back to align the plunger tip with the nozzle tip during an advancing stroke, thereby purging the bore of the nozzle 14 of the hot molten plastic. The plunger tip 20 rests at the fully advanced position at the nozzle tip 15 as shown in FIGS. 1 and 2 during most of the cycle.

A hydraulic power apparatus 21 is an example of a power system suitable for the shifting of the injection plunger 26 through its various positions during an injection molding cycle. Fluid line 22, 23 permit the flow of hydraulic fluid through a hydraulic cylinder 24, thereby moving a piston 25 controlling the injection plunger 26. A flange 27 on a portion of the injection plunger intermediate the injection nozzle 14 and hydraulic cylinder 24 can abut against a silencing cushion 28 at the advanced position, and against a similar cushioning washer 29 when at the fully withdrawn position.

Particular attention is directed to a system 31 for braking and sensing the movements of the plurality of injection plunger 26. A simultaneity control 32 receives the signals from sensors during the withdrawal stroke of the injection plunger, and each injection plunger is braked or arrested as soon as it was withdrawn to a position immediately prior to the opening of the orifices 19. Such a position is illustrated in FIG. 3. As soon as the simultaneity control 32 has received the signals assuring the withdrawal of each of the injection plungers to the braked brink of opening, then the simultaneity control simultaneously releases the brakes for each of the injection plungers, which can then continue toward their fully withdrawn positions for simultaneously opening all of the orifices 19. The fully withdrawn position of an injection plunger is illustrated in FIG. 4. Any of a variety of electrical or hydraulic or mechanical controls can be employed in the system 31. For example, a pin 33 can serve as a sensor detecting the advancing of flange 27 into contact therewith, and for sending the signal reporting such position to the simultaneity control 32. The pin 33 can also function as a brake stopping the flange so that the tip 20 of the injection plunger is at a point such that the orifice 19 is fully closed, but near the brink of opening. After the simultaneity control has received the messages from the pins 33, for each of the plurality of injection plungers, then and only then is the signal sent from the simultaneity control 32 to each of the pins 33 to release each of the plurality of injection plungers 26 simultaneously. The pin 33 can be yieldingly urged into a locking position by a spring and shifted into a released position by a solenoid, and held in the released position by the solenoid until after the injection plunger tip has again returned to adjacent the tip of the nozzle, when the spring can return the pin 33 to its locking position. A strain gauge on the pin 33 detects the contact with the flange 27, and transmits to the simultaneity control 32 the signal reporting that the pin is serving as a brake. Various modifications of the position detecting and position locking devices can be employed so long as they provide the signals to the simultaneity control and are actuated by the simultaneity control.

I claim:

1. In apparatus for injecting flowable plastic into molds for the preparation of giant articles, said apparatus comprising means directing flowable plastic to entry ports of a plurality of nozzles, said flowable plastic being injected into the mold by the nozzles, each nozzle having an injection plunger reciprocating on a selected schedule in a bore, in which the injection plunger withdraws from its most advanced position to its most retarded position during a withdrawing stroke, the flow of flowable plastic toward the mold being initiated as the injection plunger exposes the entry port during the final portion of such withdrawing stroke, the mold being filled while the injection plunger is near its retarded position, the flow of plastic toward the mold is terminated at the initial portion of purging stroke of the injection plunger, and in which substantially all of the residual flowable plastic material in the bore of the nozzle is purged as the injection plunger advances during its purging stroke to inject flowable plastic into the mold, the improvement which consists of the combination of:

a plurality of braking means, each adapted to stop and injection plunger subsequent to a major fraction of its withdrawal stroke but prior to initiating normal flow of plastic through a nozzle toward the mold;

a plurality of sensor means, each adapted to detect the return of an injection plunger to a position at which it is stopped by such braking means, said sensor means providing signals while an injection plunger is stopped by braking means;

simultaneity control means responsive to the signals from each of said sensor means for releasing simultaneously the braking means for each of said injection plungers only after each of the injection plungers has been braked, whereby the opening of the flow of plastic through a nozzle toward the mold is substantially simultaneous for all nozzles; and means actuating the injection plungers for said purging stroke and the multiple step withdrawing stroke.

2. The apparatus of claim 1 in which each injection plunger is actuated by a hydraulic cylinder and the plurality of hydraulic cylinders are actuated by a manifolded supply of pressurized hydraulic fluid flowing to the cylinders.

3. The apparatus of claim 1 adapted to fill molds with predominantly thermoplastic cellular plastic during a mold-filling step which is of significantly shorter duration than the step of colling the article in the mold.